(12) United States Patent
Goos et al.

(10) Patent No.: US 12,313,120 B2
(45) Date of Patent: May 27, 2025

(54) MAGNETIC BEARING DEVICE AND POSITIONING SYSTEM

(71) Applicant: PHYSIK INSTRUMENTE (PI) SE & CO. KG, Karlsruhe (DE)

(72) Inventors: Alexander Goos, Ettlingen (DE); Daniel Geissler, Baden-Baden (DE)

(73) Assignee: PHYSIK INSTRUMENTE (PI) SE & CO. KG (DE)

( * ) Notice: Subject to any disclaimer, the term of this patent is extended or adjusted under 35 U.S.C. 154(b) by 294 days.

(21) Appl. No.: 18/025,543

(22) PCT Filed: Sep. 8, 2021

(86) PCT No.: PCT/EP2021/074649
§ 371 (c)(1),
(2) Date: Mar. 9, 2023

(87) PCT Pub. No.: WO2022/053480
PCT Pub. Date: Mar. 17, 2022

(65) Prior Publication Data
US 2023/0323915 A1    Oct. 12, 2023

(30) Foreign Application Priority Data
Sep. 10, 2020    (DE) .................... 10 2020 123 634.4

(51) Int. Cl.
*F16C 32/04*    (2006.01)
*H02K 7/09*    (2006.01)
*H02K 41/03*    (2006.01)

(52) U.S. Cl.
CPC ...... *F16C 32/0465* (2013.01); *F16C 32/0472* (2013.01); *H02K 7/09* (2013.01); *H02K 41/031* (2013.01); *H02K 2201/18* (2013.01)

(58) Field of Classification Search
CPC .. F16C 32/0465; F16C 32/0472; F16C 29/00; F16C 2370/00; F16C 2380/18;
(Continued)

(56) References Cited

U.S. PATENT DOCUMENTS 5,925,956 A * 7/1999 Ohzeki .................... H02K 7/09
                                                                318/135
5,982,065 A   11/1999 Jamain et al.
(Continued)

FOREIGN PATENT DOCUMENTS

CN    105387310 A    3/2016
CN    109690099 A    4/2019
(Continued)

OTHER PUBLICATIONS

International Search Report (English and German) issued in PCT/EP2021/074649, mailed Dec. 20, 2021; ISA/EP (5 pages).
(Continued)

*Primary Examiner* — Ahmed Elnakib
(74) *Attorney, Agent, or Firm* — Harness, Dickey & Pierce, P.L.C.

(57) ABSTRACT

A magnetic bearing device and a positioning system which includes the magnetic bearing device are provided. The magnetic bearing device comprises a stator and a moving member which are formed from a coil device with at least one coil body, magnets, and/or flux guide members, where the moving member is movable relative to the stator along a direction of motion and the stator and the moving member are configured such that a magnetic force can be exerted upon the moving member when electrical energy is applied to the coil device to form an air gap between the stator and the moving member. The coil device is arranged exclusively in the stator and the extension of the moving member in the direction of motion is smaller than the extension of the stator
(Continued)

in this direction. The extension of the stator corresponds to the length of the at least one coil body.

20 Claims, 4 Drawing Sheets (58) Field of Classification Search
CPC .... H02K 7/09; H02K 41/031; H02K 2201/18; H02K 2213/03
USPC ................................. 310/12.05, 2.04, 12.31
See application file for complete search history.

(56) References Cited

U.S. PATENT DOCUMENTS

| | | | | |
|---|---|---|---|---|
| 6,445,093 | B1* | 9/2002 | Binnard | G03F 7/70716 310/12.25 |
| 6,452,292 | B1* | 9/2002 | Binnard | G03F 7/70758 414/935 |
| 6,906,789 | B2* | 6/2005 | Carter | G03F 7/70758 355/71 |
| 9,479,040 | B2* | 10/2016 | Schäffel | H02K 7/09 |
| 2010/0327669 | A1* | 12/2010 | Toyota | G03F 7/70716 310/12.05 |
| 2015/0211575 | A1* | 7/2015 | Kim | H01F 27/08 310/90.5 |
| 2018/0370634 | A1* | 12/2018 | Augustyniak | B64D 11/0007 |
| 2020/0248747 | A1 | 8/2020 | Peijnenburg et al. | |

FOREIGN PATENT DOCUMENTS

| | | |
|---|---|---|
| DE | 2807044 A1 | 8/1979 |
| DE | 3719587 A1 | 12/1988 |
| JP | S61-092158 A | 5/1986 |
| JP | 2009-516495 A | 4/2009 |
| WO | 2009/128321 A1 | 10/2009 |

OTHER PUBLICATIONS

Dong-Chul Han et al., "The High Precision Linear Motion Table With a Novel Rare Earth Permanent Magnet Biased Magnetic Bearing Suspension", Jul. 21, 1999 (5 Pages).
Sang-Ho Lee et al., "Design of Novel Permanent Magnet Biased Linear Magnetic Bearing and its Application to High-Precision Linear Motion Stage", 8th Int. Symposium on Magnetic Bearing, Aug. 26-28, 2002, pp. 543-548 (6 Pages).
Japanese Office Action for JP 2023-515849 (Japanese and English), mailed Mar. 19, 2024; (20 pages).
Korean Office Action for KR 2023-515849 (Korean and English), mailed Feb. 18, 2025 (10 pages).
German Office Action for DE 10 2020 123 634.4 (German and English), mailed Jul. 21, 2021 (16 pages).

* cited by examiner

MAGNETIC BEARING DEVICE AND POSITIONING SYSTEM

CROSS REFERENCE TO RELATED APPLICATIONS

This application is a U.S. National Phase Application under 35 U.S.C. 371 of International Application No. PCT/EP2021/074649, filed on Sep. 8, 2021, which claims priority to German Patent Application No. 10 2020 123 634.4, filed on Sep. 10, 2020. The entire disclosures of the above applications are expressly incorporated by reference herein.

BACKGROUND

Technical Field

The present invention relates to a magnetic bearing device and a positioning system.

Related Art

One magnetic bearing device is known from publication 1 "Design of Novel Permanent Magnet Biased Linear Magnetic Bearing and its Application to High-Precision Linear Motion Stage", Sang-Ho Lee et al. and publication 2 "The High Precision Linear Motion Table With a Novel Rare Earth Permanent Magnet Biased Magnetic Bearing Suspension", Dong-Chul Han et al.

Publication 1 describes a magnetic bearing device which comprises a stator and a moving member that is movable relative to the stator along a direction of motion. The magnetic bearing device is assembled substantially from flux guide members, magnets, and coils and is configured such that, when electrical energy is applied to the coils, it can exert a magnetic force upon the moving member which enables full compensation of the weight force of the moving member and thereby acts as a lifting force on the moving member. In particular, the energized coils generate a magnetic field that interacts with the magnetic field generated by the magnets. The active elements (coils) are disposed in the moving member, which has the disadvantage that the cables required for the supply of electrical power must be attached to the moving member and must be carried along when the moving member moves relative to the stator. Alternatively, wireless energy transmission would have to be provided or energy bearing elements would have to be arranged in the moving member, which would lead to a significant increase in the moving member's weight. Furthermore, the electrically induced heat input in this configuration can only be dissipated via the air and possibly via cables.

Publication 2 describes an XY table which likewise comprises part of the structure of the magnetic bearing device of publication 1. However, the active elements (coils) are part of the stator there, which means that the electrical energy no longer has to be supplied to the moving member. Disadvantages of this configuration, however, are the significantly shorter adjustment range and the change in the force application points compared to the moving member coordinate system during the motion of the moving member. In particular, the force application points are position-dependent due to the geometric dimensions, whereby position-dependent lever arms arise with regard to a torque, which is disadvantageous for controlling such a system and also leads to position-dependent power requirement along the direction of motion.

The invention is therefore based on the object of improving a magnetic bearing device in such a way that a simple and independent configuration of the moving member, sufficiently large dissipation of the electrically induced heat input, as well as position-independent control over a greater adjustment range is obtained.

SUMMARY

To satisfy this object, the present invention provides a magnetic bearing device.

The object is satisfied in that the coil device is arranged exclusively in the stator and the extension of the moving member in the direction of motion is smaller than the extension of the stator in this direction, where, the extension of the stator corresponds to the length of the at least one coil body.

Due to the active element (i.e. the coil device or its coil body) being part of the stator, no energy needs to be transferred to the moving member. The moving member therefore embodies a completely passive assembly, which can be reduced to a minimum in terms of its dimensions and weight. As a result, the forces required for acceleration and movement can be reduced or higher accelerations can be obtained. Overall, the power input that is required to move the moving member along the stator can be significantly reduced as a result. Furthermore, hardly any magnetic reversal processes occur in the flux guide members along the direction of motion, which means that only very minor hysteresis losses arise in the flux guide members.

Due to the arrangement of the coil device in the stator, the heat input also takes place exclusively in the stator. Since a high thermal coupling can be achieved between the stator as a stationary component and an adjoining structure, in particular a casing, the heat input can be dissipated efficiently from the stator.

The smaller extension of the moving member in the direction of motion compared to that of the stator in this direction leads to a position-independent lever arm length. As a result, the power requirement is independent of the position of the moving member and a more linear system is created from a perspective of systems theory. In addition, this makes it possible for the moving member to be displaced along the stator with significantly fewer changes with regard to the torques caused. As a result, the magnetic bearing device according to the invention enables the moving member to be displaced along the stator without or almost without a change in the force and torque constants, similar to a mechanical guide.

Advantageous further developments are also objects of the present invention.

For example, it can prove to be advantageous to have the extension of the moving member in the direction of motion be smaller than ¾, preferably smaller than ½, preferably smaller than ⅓, particularly preferably smaller than or equal to ¼, of the extension of the stator in this direction. The advantages described above can be increased with an increasing reduction in the extension ratio of the moving member to the stator. Various installation space requirements can also be met by adapting the extension ratio.

It can be useful to have the moving member comprise at least two flux guide members which are arranged on oppositely disposed sides of the stator and are connected to one another by an element that is non-magnetic, at least in part. As a result of this configuration, the moving member engages around the stator in as compact a structural shape as possible. The connecting element is preferably made of non-magnetizable material so that a compact structural shape can be implemented. If a compact structural shape is not crucial, then it can be advantageous to use magnetizable material for the connecting element, but subject to the condition that there be a sufficiently large spacing from the stator so that the flux in the air gap therebetween is kept low and no or only low forces of attraction then arise. It is conceivable there to configure that flux-conducting side member of the stator that is closer to the connecting element to have an "E-shape" and to insert a further coil therein. This would make it possible to generate a lateral force while having an air gap that is smaller in relation to the connecting element made of magnetizable material.

It can also be useful to have each coil body of the coil device extend in its dedicated plane (xy), where the length of the magnets and flux guide members of the stator preferably correspond in the direction of motion to the length of the sections of each coil body extending in parallel. Due to the same length of the magnets, flux guide members, and sections of the coil bodies extending in parallel, a homogeneous region can be created which enables a high degree of uniformity with regard to the motion of the moving member.

It can be advantageous to have the magnets in the stator each be arranged between two flux guide members. This arrangement prevents the magnets from being demagnetized by the magnetic field generated by the coil device.

It can prove to be useful to have the coil device comprise coil bodies arranged one above the other and the magnets be arranged in a plane between the coil bodies. With this configuration, magnetic fields can be generated that act selectively with one another or selectively against one another.

It can be advantageous to have each coil body comprise an opening and a flux guide member be arranged in the opening of each coil body.

It can be useful to have each coil body be arranged between two flux guide members that extend in parallel and that preferably extend in the direction of motion, and that preferably at least one of these flux guide members comprise a coupling section at which it can be coupled to a further structure, preferably to a casing. In this configuration, the flux guide not only conducts the magnetic flux but also serves as a structural component for connecting the stator to a casing.

It can also be useful to have the stator comprise a central flux guide member with a cross-shaped cross section and oppositely disposed sections of the central flux guide member be arranged in the openings of different coil bodies. This configuration enables the selective guidance of the magnetic flux while having a compact design. However, other cross sections are also conceivable for the central flux guide member, for example such having a plate-shaped geometry. A corresponding cross-sectional geometry has the advantage of significantly reduced manufacturing costs for the flux guide member.

It can be useful to have the magnets and/or the flux guide members be formed integrally or in pieces.

It can be practical to have the magnetic bearing device comprise a magnetic guide which is configured to move the moving member in a plane perpendicular to the magnetic force and in a direction perpendicular to the direction of motion. By generating a magnetic lateral force which acts in the plane perpendicular to the direction of action of the magnetic lifting force and in a direction perpendicular to the direction of motion, the moving member can be positioned in this direction.

It can be useful to have the magnetic guide comprise a guide moving member which is connected to the moving member, preferably by way of non-magnetic material. An assembly can be created in this way on which both the magnetic lifting force and the magnetic lateral force act.

It can be advantageous to have the magnetic guide comprise a coil device with a pair of coil bodies which extends in a plane, where the stator and the moving member are arranged in a direction perpendicular to this plane above the pair of coil bodies and the guide moving member is arranged between the moving member and the pair of coil bodies, where the guide moving member comprises permanent magnets which are arranged preferably in the configuration of a Halbach array. The coil device of the magnetic guide can also comprise only one coil body or more than two coil bodies. Configurations of the permanent magnets that deviate from the Halbach array arrangement are also possible for the guide moving member.

In addition, the present invention comprises a positioning system comprising at least one magnetic bearing device according to one of the preceding embodiments, a casing, and a platform, where the stator is coupled to the casing and the platform is coupled to the moving member. It is possible to position the platform relative to the stator without friction losses with such a positioning system.

It can be advantageous to have the positioning system further comprise a linear motor which is configured to move the platform relative to the casing in the direction of motion. High-precision positioning of the platform can be achieved by selecting the control parameters for the linear motor and the magnetic bearing device.

It can be advantageous to have the positioning system include at least one electronic component with at least a sensor, preferably in the form of a sensor board. It is conceivable that the positioning system includes further electronic components, for example, a motor driver, a motor controller, and logical digital modules. It can be advantageous there for two or more electronic components to be arranged on a common circuit board or a printed circuit board. This measure enables the power input to be reduced since there is no power loss due to otherwise necessary supply lines or cables. In addition, the spatial integration of the electronic component(s) results in a very compact design of the positioning system so that, for example, an external controller can be dispensed with.

Terms and Definitions

In the simplest case, the term "coil device" comprises a coil body, the turns of which are arranged concentrically and run in a common plane. It additionally comprises a coil body, the concentric turns of which extend in several different planes. The turns of a coil body can there be embedded in material such as epoxy resin. It is conceivable to connect or couple individual coil bodies of the coil device to one another electrically in parallel or in series.

The term "non-magnetic" describes non-magnetizable as well as very weakly or not permanently magnetizable materials, and in particular excludes materials with permanent magnetic or ferromagnetic properties. Non-magnetizable materials include, for example, aluminum, while the term "magnetizable materials" includes ferromagnetic or paramagnetic materials such as iron or alkali metals.

DETAILED DESCRIPTION

Preferred embodiments of the present invention shall be described in detail below with reference to the appended figures.

Figure 1:
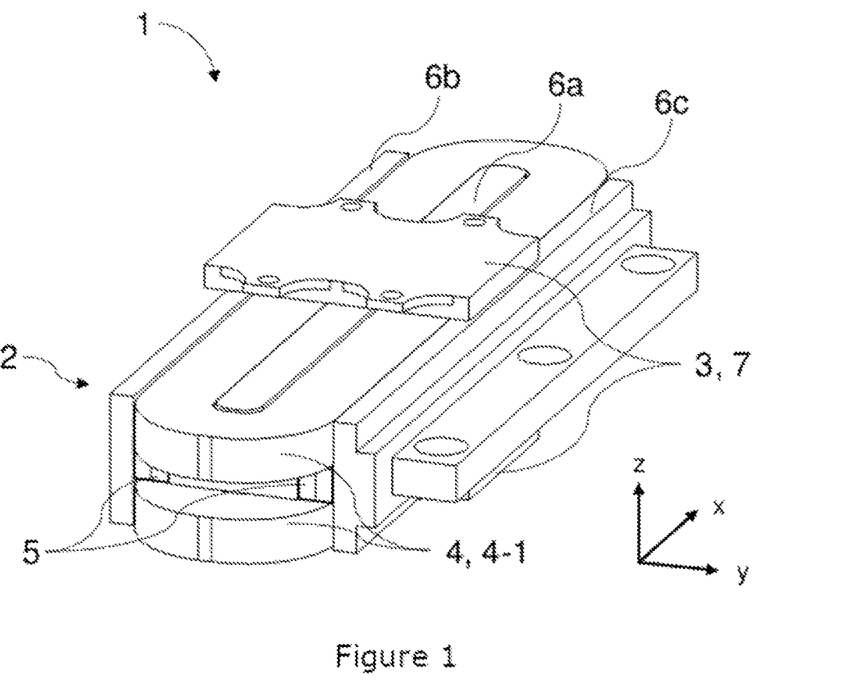
FIG. 1 shows a perspective view of an embodiment of the magnetic bearing device according to the invention.

FIG. 1 shows in a perspective view an embodiment of magnetic bearing device 1 according to the invention. Magnetic bearing device 1 comprises a stator 2 and a moving member 3.

Stator 2 contains a coil device 4 with two separate coil bodies 4-1 which are not electrically connected to one another and which are arranged in the z direction one above the other and consequently in parallel x-y planes. The length of coil bodies 4-1 extends in the x direction. Stator 2 further comprises three flux guide members 6a, 6b, 6c made of a magnetizable steel and four magnets 5 (only two of them can be seen in the figures), the lengths of which likewise extend in the x direction. It can be seen in FIG. 2 that two flux guide members 6b, 6c flank coil bodies 4-1 as outer flux guide members 6b, 6c in such a way that they are disposed in the y direction between two outer flux guide members 6b, 6c. Third flux guide member 6a is arranged as a central flux guide member 6a in the y direction between outer flux guide members 6b, 6c and in the z direction between coil bodies 4-1. In the present embodiment, central flux guide member 6a has a cross-shaped cross section and therefore projects with oppositely disposed sections into the openings of coil bodies 4-1. One of outer flux members 6c is further provided with a coupling section which extends along flux guide member 6c in the x direction and enables a connection to a further structure, in particular to a casing. Two magnets 5 are each arranged in the y direction between an outer flux guide member 6b, 6c and central flux guide member 6a and in the z direction between coil bodies 4-1. The height of flux guide members 6a, 6b, 6c in the z direction is selected such that flux guide members 6a, 6b, 6c terminate flush with the upper or lower end face of coil bodies 4-1. Two substantially planar main surfaces of stator 2 are thus formed. Deviations from the flush termination of flux guide members 6a, 6b, 6c with the upper or lower end face, respectively, of coil bodies 4-1 are possible, where a clear projection of flux guide members 6a, 6b, 6c over the end faces of coil bodies 4-1 is specifically advantageous for certain applications, for example, in vacuum applications, in order to thereby guide the magnetic flux quasi through a lock, where a magnetic coil flux guide takes place within the vacuum while coil body 4-1 and magnets 5 are arranged outside the vacuum. If flux guide members 6a, 6b, 6c project below the end faces of coil bodies 4-1, e.g., an E-shape can be selected with regard to the coil flux guide. It is also conceivable that only individual ones of flux guide members 6a, 6b, 6c terminate with the end faces of coil bodies 4-1, and that the coil flux guide is formed to be correspondingly complementary.

Moving member 3 comprises two preferably identical flux guide members 7 which are arranged on oppositely disposed sides of stator 2, and an element that is non-magnetic at least in part which connects the two flux guide members 7 to one another (not shown). Moving member 3 is therefore configured in such a way that it engages around stator 2. Flux guide members 7 can likewise comprise coupling sections that enable joining to a further structure, in particular a platform. When viewed in the y direction, flux guide members 7 project over stator 2 (see in particular FIG. 5), which results in only low restoring forces in the y direction and enables a reduced power input into the magnetic bearing device for generating a motion along the y direction. Furthermore, flux guide members 7 can have a particular shape, for example, an "E-shape", in order to obtain translational restoring forces in the y direction and rotatory restoring forces about the z-axis. The length of moving member 3 in the x direction is significantly shorter than the length of stator 2 in this direction. In the present embodiment, the length of the moving member in the x direction is ¼ of the length of the stator in this direction. The length ratio of moving member 3 to stator 2 in the x direction is not restricted to this value, but can have any value that is preferably smaller than ¾.

Figure 2:
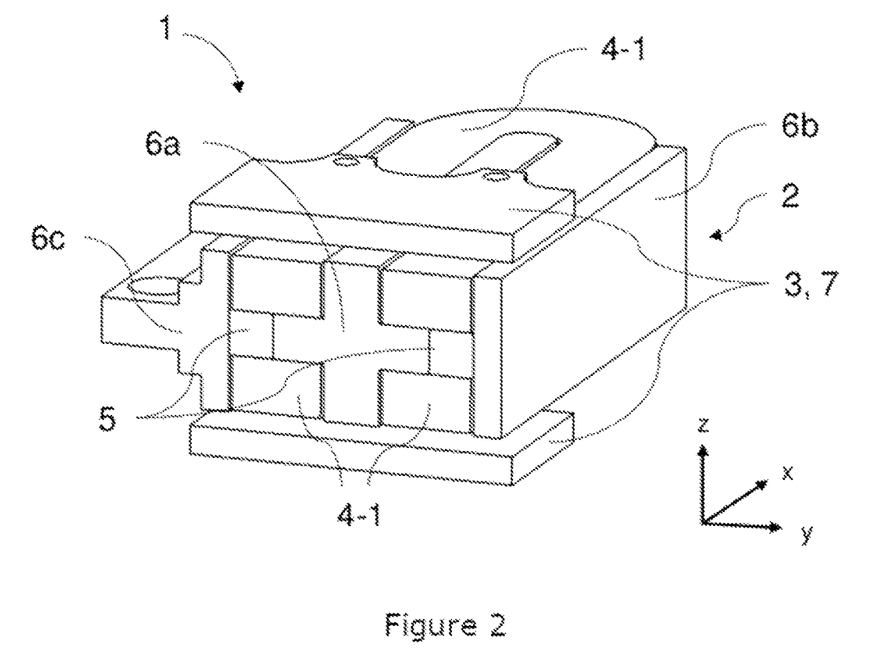
FIG. 2 shows a sectioned perspective illustration of the embodiment according to FIG. 1.

In general, flux guide members 6a, 6b, 6c, 7 of stator 2 and moving member 3 as well as magnets 5 of stator 2 are not restricted to the shapes shown in the figures, but can have any suitable shape, in particular shapes that facilitate the integration of stator 2 and moving member 3 in superior structures (e.g. the casing and the platform). Furthermore, flux guide members 6a, 6b, 6c, 7 and magnets 5 can be formed both integrally and in pieces. In particular, it is conceivable for flux guide members 6a, 6b, 6c and 7 to be configured as a layered structure or as a laminate, where layers of magnetizable material and layers with electrically non-conductive material alternate. Coil bodies 4-1 are preferably wire coils. In addition, however, it is also possible to use film coils or printed coils.

Magnetic bearing device 1 can be actuated by applying electrical energy to coil bodies 4-1. Energized coil bodies 4-1 generate magnetic fields in flux guide members 6a, 6b, 6c, 7 which interact with the magnetic field generated by magnets 5. In particular, these magnetic fields can act with one another or against one another. If the magnetic field of upper coil body 4-1 counteracts the magnetic field of magnets 5 in the upper part of flux guide members 6a, 6b, 6c, 7, then the magnetic field of lower coil body 4-1 can enhance the magnetic field of magnets 5 in the lower part of flux guide members 6a, 6b, 6c, 7 in that the correct control parameters (current direction) are selected.

With a suitable selection of the control parameters, a magnetic force (lifting force) can be exerted upon moving member 3 which leads to the formation of an air gap between upper flux guide member 7 of moving member 3 and the upper main surface of stator 2 as well as between lower flux guide member 7 of moving member 3 and the lower main surface of stator 2 In particular, the size of the air gap, i.e. the spacing between the main surfaces of stator 2 and flux guide members 7 of moving member 3 in the z direction can be adjusted by adapting the control parameters. This magnetic force acting as a lifting force is then able to compensate for the weight force of moving member 3. With the simultaneous stabilization of moving member 3 with respect to its degrees of freedom of rotation about the X and Y axes, moving member 3 levitates and can be displaced without friction relative to stator 2 along the x direction.

The adjustment range of moving member 3 is determined substantially by the length of flux guide members 6a, 6b, 6c and magnets 5 of stator 2. Due to the length ratio of moving member 3 to stator 2 in the x direction described above, correspondingly large adjustment ranges can be realized. There is the further possibility of connecting several stators 2 in series along the x direction and actuating them in a suitable manner in order to further increase the adjustment range of moving member 3 in the sense of a continuous system.

Figure 3:
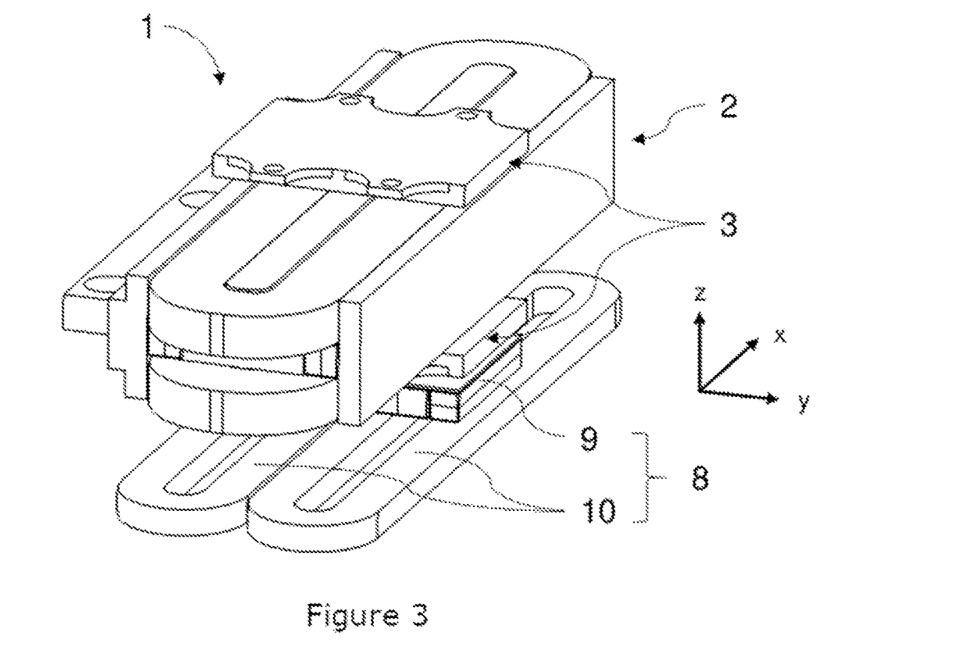
FIG. 3 shows a perspective illustration of a further development of the embodiment of the magnetic bearing device according to FIG. 1 which comprises a magnetic guide in the form of a pair of coil bodies arranged next to one another and a guide moving member.
Figure 4:
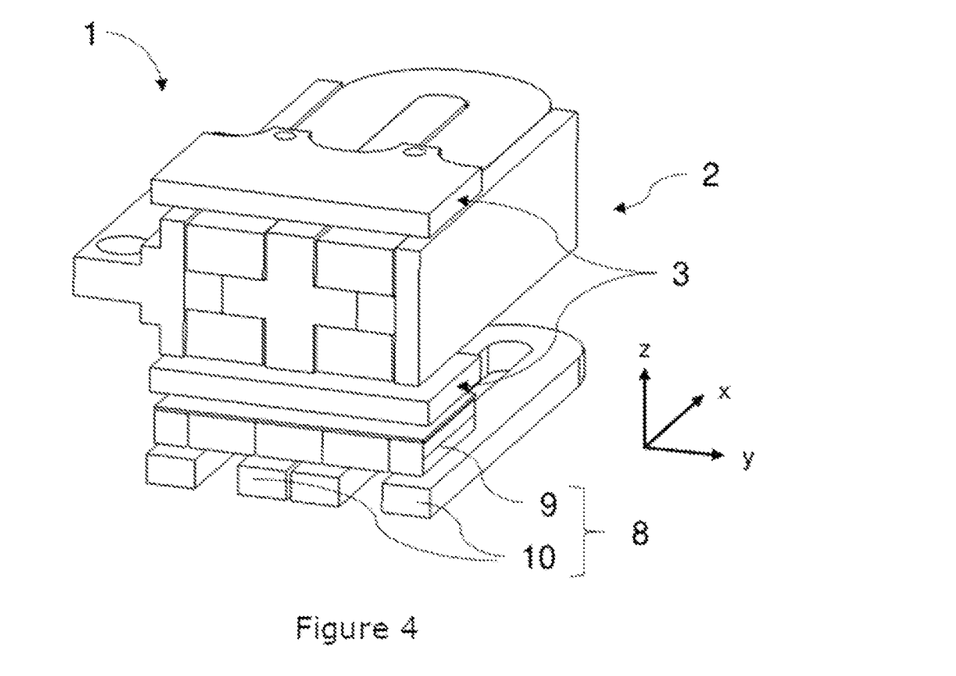
FIG. 4 shows a sectioned perspective illustration of the embodiment according to FIG. 3.
Figure 5:
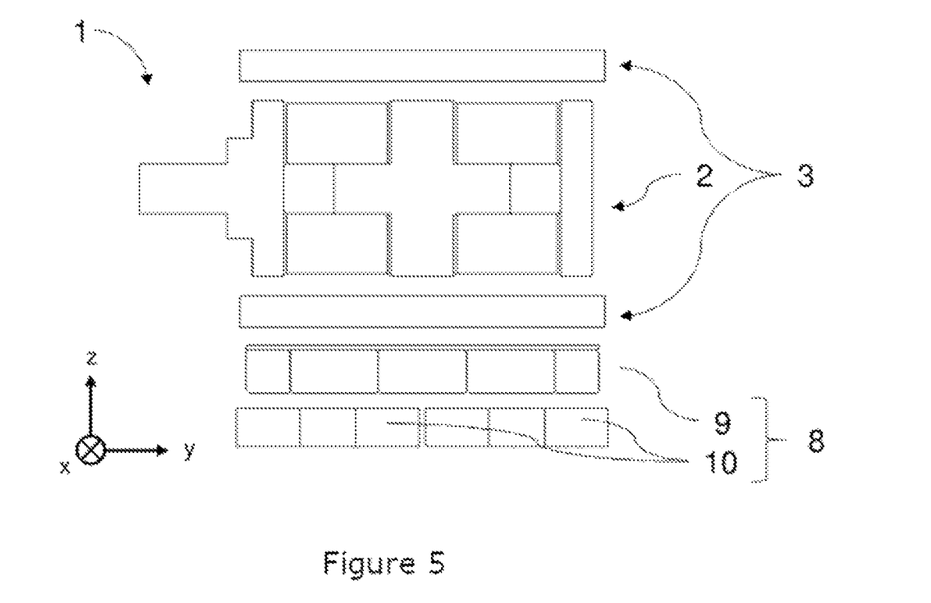
FIG. 5 shows a sectional view of the embodiment according to FIG. 4.

FIGS. 3 to 5 show a further development of magnetic bearing device 1 according to the embodiment described above. This further development additionally comprises a magnetic guide 8 which is configured to move moving member 3 in the y direction. A magnetic force (lateral force) which moves the moving member in the y direction is generated, in particular, with the aid of magnetic guide 8. The position of moving member 3 can be adjusted therewith in the y direction. Magnetic guide 8 comprises a coil device with a pair of coil bodies 10 which is arranged in a common x-y plane below the moving member-stator assembly, as well as a guide moving member 9 which is arranged in the z direction between coil body 10 and the moving member-stator assembly. Guide moving member 9 is connected to moving member 3 by way of a connecting element made of aluminum, which cannot be gathered from the figures. However, the connecting element can be produced from any other material. If, for example, a magnetic coupling is desired, for example, to increase the flux in lower flux guide member 7, it can be advantageous to configure the connecting element to be of magnetizable material. The amplification of the flux in lower flux guide member 7 can be advantageous so that an asymmetrical force characteristic or an offset in the force characteristic for the magnetic bearing device 1 is created and part of the weight force is compensated for thereby. In the present embodiment, this connection is preferably formed between mutually facing surfaces of guide moving member 9 and of lower flux guide member 7 of moving member 3. Furthermore, guide moving member 9 comprises permanent magnets which are arranged in a Halbach array configuration, where differing arrangements of the permanent magnets in relation to one another are also conceivable. Depending on the case of application, guide moving member 9 can be magnetically coupled to moving member 3 or magnetically decoupled therefrom.

Figure 6:
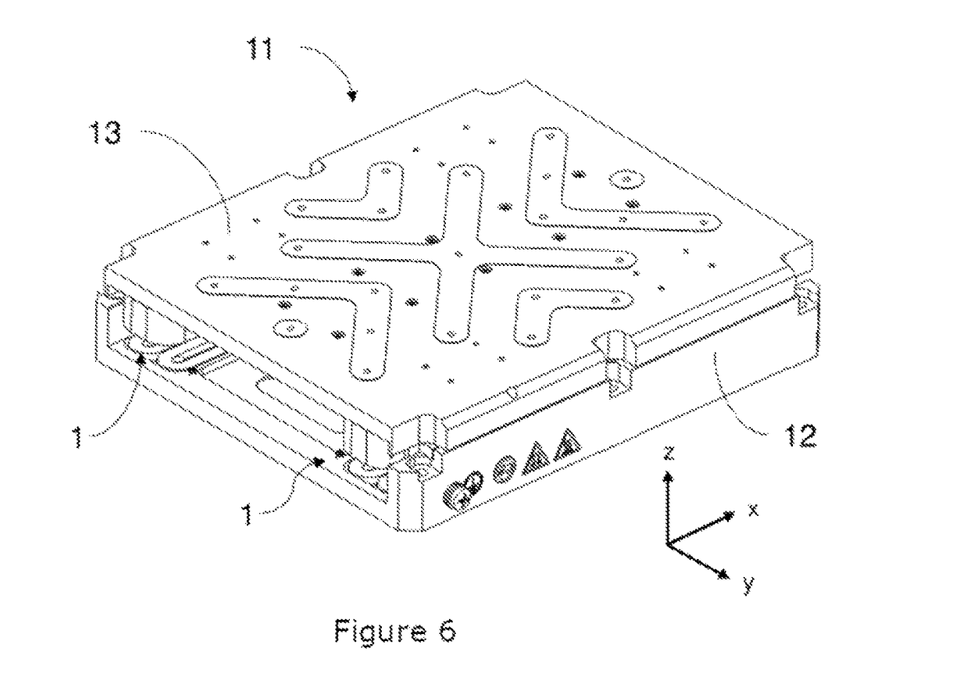
FIG. 6 shows a perspective illustration of a positioning system according to the invention.
Figure 7:
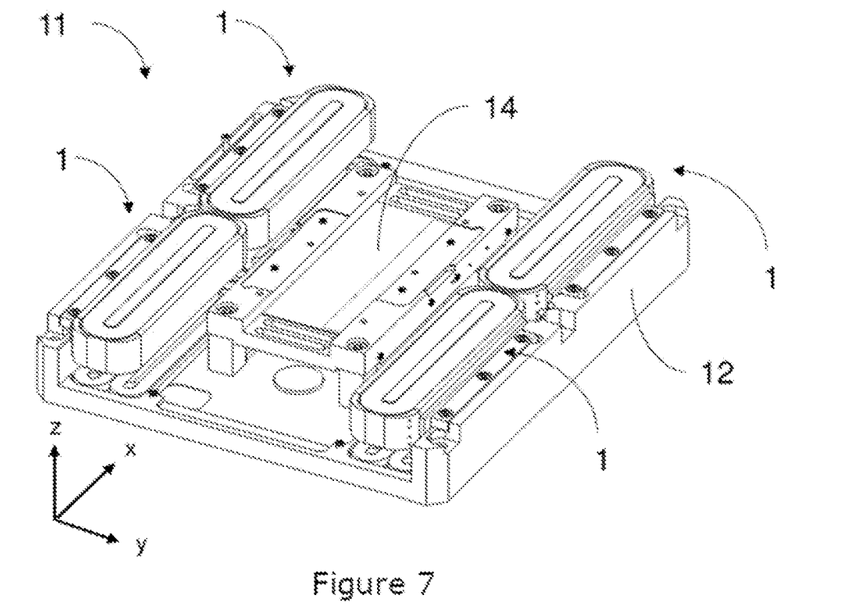
FIG. 7 shows the positioning system according to FIG. 6, where the platform is not shown for the purpose of illustration.
Figure 8:
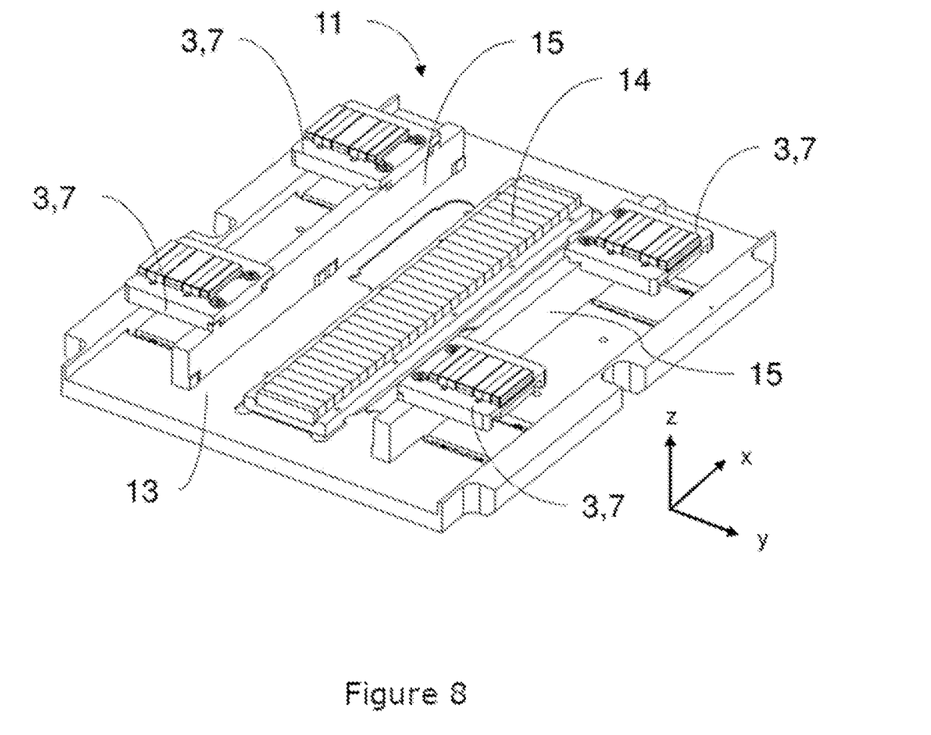
FIG. 8 shows a rear view of the positioning system according to FIG. 6, where the casing as well as the stators are not shown for the purpose of illustration.

FIGS. 6 to 8 show a positioning system 11 comprising four magnetic bearing devices 1 according to the embodiment described above, four magnetic guides 8, a casing 12, a platform 13, as well as a linear motor 14.

However, it is conceivable to use mechanical guides or air bearings instead of magnetic guides. Casing 12 is configured as a rectangular plate, where the plate is provided with a side wall on two oppositely disposed sides. Two magnetic bearing devices 1 are arranged consecutively along each side wall. One of outer flux guide members 6c of stator 3 of each magnetic bearing device 1 is there attached with the aid of its coupling section to the respective side wall. The stator part (coil device) of a linear motor 14 is arranged at the center of the plate.

Platform 13 is coupled to each moving member 3 of four magnetic bearing devices 1. As shown in FIG. 8, platform 13 is coupled to lower flux guide member 7 as well as to upper flux guide member 7 of each moving member 3. The coupling to the upper flux guide members is effected by way of recesses in the platform surface. The coupling to lower flux guide members 7 is effected by way of two connecting webs 15 which are arranged on the underside of platform 13. Each connecting web 15 connects platform 13 to lower flux guide members 7 of two moving members 3 arranged consecutively. Furthermore, the moving member part (permanent magnets) of linear motor 14 is arranged at the center of platform 13.

6D-positioning of platform 13 can be realized without friction losses with positioning system 11 described above. Furthermore, highly precise positioning of platform 13 can be achieved by the selection of the respective control parameters.

The number of magnetic bearing devices 1 in positioning system 11 is not restricted to four and can be adapted depending on the case of application or the installation situation. In the simplest case, it is sufficient to have positioning system 11 comprise one magnetic bearing device 1.

The invention claimed is:

1. A magnetic bearing device comprising:
a stator and a moving member which are formed from at least one coil device with at least one coil body, magnets, and/or flux guide members,
said moving member being movable relative to said stator along a direction of motion, and
said stator and said moving member are configured such that a magnetic force is exerted upon said moving member when electrical energy is applied to said coil device in order to form an air gap between said stator and said moving member,
wherein said coil device is arranged exclusively in said stator and the extension of said moving member in said direction of motion is smaller than the extension of said stator in said direction of motion direction, and
the extension of said stator corresponds to a total length of said at least one coil body.

2. The magnetic bearing device according to claim 1, wherein the extension of said moving member in said direction of motion is smaller than ¾ of the extension of said stator in said direction of motion.

3. The magnetic bearing device according to claim 1, wherein said moving member comprises at least two flux guide members which are arranged on oppositely disposed sides of said stator and are connected to one another by an element that is non-magnetic at least in part.

4. The magnetic bearing device according to claim 1, wherein each coil body extends in its own plane, where a length of said magnets and flux guide members of said stator in said direction of motion corresponds to a length of sections of each coil body extending in parallel.

5. The magnetic bearing device according to claim 1, wherein said magnets in said stator are each arranged between two flux guide members.

6. The magnetic bearing device according to claim 1, wherein said coil device comprises coil bodies arranged one above another and said magnets are arranged in a plane between said coil bodies.

7. The magnetic bearing device according to claim 1, wherein each coil body comprises an opening and a flux guide member is arranged in said opening of each coil body.

8. The magnetic bearing device according to claim 1, wherein each coil body is arranged between two flux guide members that extend in parallel and that extend in said direction of motion, and at least one of said flux guide members comprises a coupling section at which it can be coupled to a further structure.

9. The magnetic bearing device according to claim 8, wherein said further structure comprises a casing.

10. The magnetic bearing device according to claim 1, wherein said stator comprises a central flux guide member with a cross-shaped cross section, and oppositely disposed sections of said central flux guide member are arranged in the openings of different coil bodies.

11. The magnetic bearing device according to claim 1, wherein said magnets and/or said flux guide members are formed integrally or in pieces.

12. The magnetic bearing device according to claim 1, wherein said magnetic bearing device comprises a magnetic guide which is configured to move said moving member in a plane perpendicular to the magnetic force and in a direction perpendicular to said direction of motion.

13. The magnetic bearing device according to claim 12, wherein said magnetic guide comprises a guide moving member which is connected to said moving member.

14. The magnetic bearing device according to claim 13, wherein said magnetic guide comprises a coil device with a pair of coil bodies which extends in a plane, where said stator and said moving member are arranged in a direction perpendicular to said plane above said pair of coil bodies, and said guide moving member is arranged between said moving member and said pair of coil bodies, where said guide moving member comprises permanent magnets which are arranged in a Halbach array configuration.

15. The magnetic bearing device according to claim 13, wherein said guide moving member is connected to said moving member by way of non-magnetic material.

16. A positioning system, comprising at least a magnetic bearing device according to claim 1, a casing, and a platform, where said stator is coupled to said casing, and said platform is coupled to said moving member.

17. The positioning system according to claim 16, furthermore comprising a linear motor which is configured to move said platform relative to said casing in said direction of motion.

18. The magnetic bearing device according to claim 1, wherein the extension of said moving member in said direction of motion is smaller than ½ of the extension of said stator in said direction of motion.

19. The magnetic bearing device according to claim 1, wherein the extension of said moving member in said direction of motion is smaller than ⅓ of the extension of said stator in said direction of motion.

20. The magnetic bearing device according to claim 1, wherein the extension of said moving member in said direction of motion is smaller than ¼ of the extension of said stator in said direction of motion.

\* \* \* \* \*